US011345485B2

(12) United States Patent
Kasahara et al.

(10) Patent No.: US 11,345,485 B2
(45) Date of Patent: May 31, 2022

(54) AIRCRAFT FUSELAGE ASSEMBLING JIG AND METHOD OF HANDLING AIRCRAFT FUSELAGE PANEL

(71) Applicant: KAWASAKI JUKOGYO KABUSHIKI KAISHA, Kobe (JP)

(72) Inventors: Kenji Kasahara, Gifu (JP); Shuhei Segawa, Aisai (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 877 days.

(21) Appl. No.: 16/095,619

(22) PCT Filed: Apr. 20, 2017

(86) PCT No.: PCT/JP2017/015847
§ 371 (c)(1),
(2) Date: Oct. 22, 2018

(87) PCT Pub. No.: WO2017/183685
PCT Pub. Date: Oct. 26, 2017

(65) Prior Publication Data
US 2019/0144134 A1 May 16, 2019

(30) Foreign Application Priority Data

Apr. 20, 2016 (JP) .............................. JP2016-084350

(51) Int. Cl.
*B64F 5/10* (2017.01)
*B21J 15/14* (2006.01)
(Continued)

(52) U.S. Cl.
CPC ................ *B64F 5/10* (2017.01); *B21J 15/142* (2013.01); *B21J 15/42* (2013.01); *B64F 5/50* (2017.01);
(Continued)

(58) Field of Classification Search
CPC .......... B23P 2700/01; B64F 5/10; B64F 5/50; B65G 39/025; B65G 39/10; B65G 39/12;
(Continued)

(56) References Cited

U.S. PATENT DOCUMENTS 2,949,992 A * 8/1960 Weinberg ............... B65G 13/12
193/35 MD
4,013,282 A * 3/1977 Kaufmann ........... B65G 39/025
269/289 MR
(Continued)

FOREIGN PATENT DOCUMENTS

| EP | 2 840 014 A1 | 2/2015 | |
| JP | 2013-198918 A | 10/2013 | |
| JP | 2017-136931 | * 8/2017 | ................ B64F 5/00 |

OTHER PUBLICATIONS

Handa, Kunio, "Aircraft Manufacturing Engineering"; Oct. 20, 2002, pp. 239-244.

*Primary Examiner* — Christopher M Koehler
(74) *Attorney, Agent, or Firm* — Oliff PLC

(57) ABSTRACT

An aircraft fuselage assembling jig is a horizontal-type jig on which an aircraft fuselage panel is placed in a laid-down state, and includes: a base with a plurality of frame indexes for positioning both ends of a plurality of aircraft fuselage frames; a plurality of header plates, each of which protrudes from the base to extend along the panel, the header plates being arranged in parallel in an axial direction of the panel; a plurality of electric cylinders radially provided on each plate, the electric cylinders moving respective receiving members in a radial direction of the panel, the receiving members contacting a skin included in the panel; and air lifting devices provided on the respective receiving members and that, when supplied with air pressure, lift the skin from receiving surfaces of the respective receiving members and support the aircraft fuselage panel such that the aircraft fuselage panel is slidable.

4 Claims, 10 Drawing Sheets

(51) Int. Cl.
　　　*B21J 15/42*　　　(2006.01)
　　　*B64F 5/50*　　　(2017.01)
　　　*B23P 19/10*　　　(2006.01)
　　　*B64C 1/06*　　　(2006.01)

(52) U.S. Cl.
　　　CPC ........... *B23P 19/10* (2013.01); *B23P 2700/01* (2013.01); *B64C 1/068* (2013.01)

(58) Field of Classification Search
　　　CPC ... B65G 2201/0294; B25B 11/02; B25H 1/02; B25H 1/10
　　　See application file for complete search history.

(56) References Cited

U.S. PATENT DOCUMENTS

| | | | |
|---|---|---|---|
| 5,427,363 A | | 6/1995 | Rink et al. |
| 6,120,185 A | * | 9/2000 | Masciarelli, Jr. ...... B65G 13/12 193/35 MD |
| 6,164,429 A | * | 12/2000 | Masciarelli, Jr. ...... B65G 13/12 193/35 SS |
| 6,279,716 B1 | * | 8/2001 | Kayatani ............. B65G 39/025 193/35 MD |
| 9,051,062 B1 | | 6/2015 | Boone et al. |
| 2001/0020762 A1 | * | 9/2001 | Helm ................... B25B 11/005 269/21 |
| 2017/0001734 A1 | * | 1/2017 | Darras ................. B23K 20/122 |
| 2017/0001735 A1 | * | 1/2017 | Darras ...................... B64C 1/12 |
| 2019/0030588 A1 | * | 1/2019 | Hirai ....................... B21J 15/42 |

* cited by examiner

AIRCRAFT FUSELAGE ASSEMBLING JIG AND METHOD OF HANDLING AIRCRAFT FUSELAGE PANEL

TECHNICAL FIELD

The present invention relates to an aircraft fuselage assembling jig used when joining a plurality of aircraft fuselage frames to an aircraft fuselage panel. The present invention also relates to a method of handling the aircraft fuselage panel relative to the aircraft fuselage assembling jig.

BACKGROUND ART

Among middle- and large-sized aircrafts, there is an aircraft whose fuselage is manufactured by coupling together a plurality of panel assemblies that are divided from each other in the circumferential direction. Each panel assembly is formed by joining a plurality of aircraft fuselage frames to an aircraft fuselage panel.

When joining the plurality of aircraft fuselage frames to the aircraft fuselage panel, extremely precise positioning of these components is necessary. Therefore, an aircraft fuselage assembling jig fabricated with high precision and having high stiffness is used (see Non-Patent Literature 1, for example). As one example, required precision of the positioning of components relative to the aircraft fuselage panel is at least ±0.25 mm even if the size of the panel is 10 m. In order to realize such precision, the aircraft fuselage assembling jig needs to be fabricated with a precision of about ±0.13 mm.

A conventional aircraft fuselage assembling jig includes: a jig body having a framing structure; a plurality of frame indexes for positioning aircraft fuselage frames, the frame indexes being fixed to the jig body; and a plurality of contour bars for positioning a skin included in an aircraft fuselage panel, the contour bars being fixed to the jig body. When using the assembling jig, first, the aircraft fuselage frames are fixed to the frame indexes. Then, the aircraft fuselage panel is placed over the aircraft fuselage frames, such that the overall skin of the aircraft fuselage panel contacts the contour bars. Thereafter, shear ties and clips, which are included in the aircraft fuselage panel, and the aircraft fuselage frames are subjected to hole machining together, and then fastened together by rivets.

CITATION LIST

Non-Patent Literature

NPL 1: "Koukuuki Seisan Kougaku (Aircraft Production Engineering)", authored by Kunio Handa, published by Office HANS on Oct. 20, 2002, pp. 239 to 244.

SUMMARY OF INVENTION

Technical Problem

However, in such a conventional aircraft fuselage assembling jig, all the contour bars are designed in accordance with the curvature of the skin of a single aircraft fuselage panel. Therefore, the jig cannot be used for a different aircraft fuselage panel. That is, the same number of aircraft fuselage assembling jigs as the number of aircraft fuselage panels need to be prepared.

In view of the above, an object of the present invention is to provide an aircraft fuselage assembling jig usable for a plurality of aircraft fuselage panels. Another object of the present invention is to provide a method of handling an aircraft fuselage panel relative to the aircraft fuselage assembling jig.

Solution to Problem

In order to solve the above-described problems, an aircraft fuselage assembling jig according to the present invention is a horizontal-type aircraft fuselage assembling jig on which an aircraft fuselage panel is placed in a laid-down state, and the aircraft fuselage assembling jig includes: a base provided with a plurality of frame indexes for positioning both ends of a plurality of aircraft fuselage frames; a plurality of header plates, each of which protrudes from the base so as to extend along the aircraft fuselage panel, the header plates being arranged parallel to each other in an axial direction of the aircraft fuselage panel; a plurality of electric cylinders radially provided on each of the plurality of header plates, the electric cylinders moving respective receiving members in a radial direction of the aircraft fuselage panel, the receiving members contacting a skin included in the aircraft fuselage panel; and air lifting devices that are provided on the respective receiving members and that, when supplied with air pressure, lift the skin from receiving surfaces of the respective receiving members and support the aircraft fuselage panel such that the aircraft fuselage panel is slidable.

According to the above configuration, in a case where the aircraft fuselage assembling jig is used for a plurality of aircraft fuselage panels whose skins have different curvatures from each other, the receiving members can be disposed, for each aircraft fuselage panel, at positions that match the curvature of the skin by adjusting the strokes of the electric cylinders. In addition, the strokes of the electric cylinders can be adjusted very highly precisely. Therefore, the aircraft fuselage assembling jig can be used for the plurality of aircraft fuselage panels.

The aircraft fuselage panel is placed on the horizontal-type aircraft fuselage assembling jig by a crane. However, in the case of performing the positioning of the aircraft fuselage panel while transferring the aircraft fuselage panel by the crane, it is difficult to perform position adjustments with a higher precision than a precision of millimeters. In this respect, in the present invention, the receiving members are provided with the air lifting devices. Accordingly, in a state where the receiving members are in contact with the skin of the aircraft fuselage panel, by supplying air pressure to the air lifting devices, the aircraft fuselage panel is rendered slidable. Therefore, while supporting the aircraft fuselage panel by the air lifting devices, the positioning of the aircraft fuselage panel can be performed with high precision.

For example, each of the air lifting devices may be an air lifting bearing including a rollable sphere that, when air pressure is supplied to the air lifting bearing, protrudes from the receiving surface of the receiving member.

A method of handling an aircraft fuselage panel according to the present invention is a method of handling an aircraft fuselage panel relative to the above-described aircraft fuselage assembling jig. The method includes: placing a frame jig holding the aircraft fuselage panel on support pedestals by a crane, the support pedestals being installed at both sides of the aircraft fuselage assembling jig; lifting the aircraft fuselage panel from the frame jig by the plurality of electric cylinders; supplying air pressure to the air lifting devices to render the aircraft fuselage panel slidable; positioning the aircraft fuselage panel while sliding the aircraft fuselage panel; and stopping supplying the air pressure to the air lifting devices after the positioning of the aircraft fuselage panel.

In a state where the receiving members have been moved to their respective design positions by operating the electric cylinders, when the aircraft fuselage panel is placed on the aircraft fuselage assembling jig, there is a risk that the load may concentrate on particular electric cylinders. In this respect, according to the above handling method, the electric cylinders lift the aircraft fuselage panel in a stationary state, and thereby the load on the electric cylinders can be made uniform.

The above handling method may include: supplying air pressure to the air lifting devices to render the aircraft fuselage panel slidable after joining a plurality of aircraft fuselage frames to the aircraft fuselage panel; slidingly moving the aircraft fuselage panel to a position at which the aircraft fuselage panel is holdable by the frame jig; lowering the aircraft fuselage panel by the plurality of electric cylinders and holding the aircraft fuselage panel by the frame jig; and transferring the frame jig, which is holding the aircraft fuselage panel, from above the aircraft fuselage assembling jig to a different location by the crane. This method makes it possible to transfer a panel assembly in which the aircraft fuselage frames are joined to the aircraft fuselage panel to the different location by the crane while holding the panel assembly by the frame jig.

Advantageous Effects of Invention

The present invention provides an aircraft fuselage assembling jig usable for a plurality of aircraft fuselage panels.

BRIEF DESCRIPTION OF DRAWINGS

FIG. 6A shows a state where no air pressure is supplied to an air lifting bearing; and FIG. 6B shows a state where air pressure is supplied to the air lifting bearing.

DESCRIPTION OF EMBODIMENTS

Figure 1:
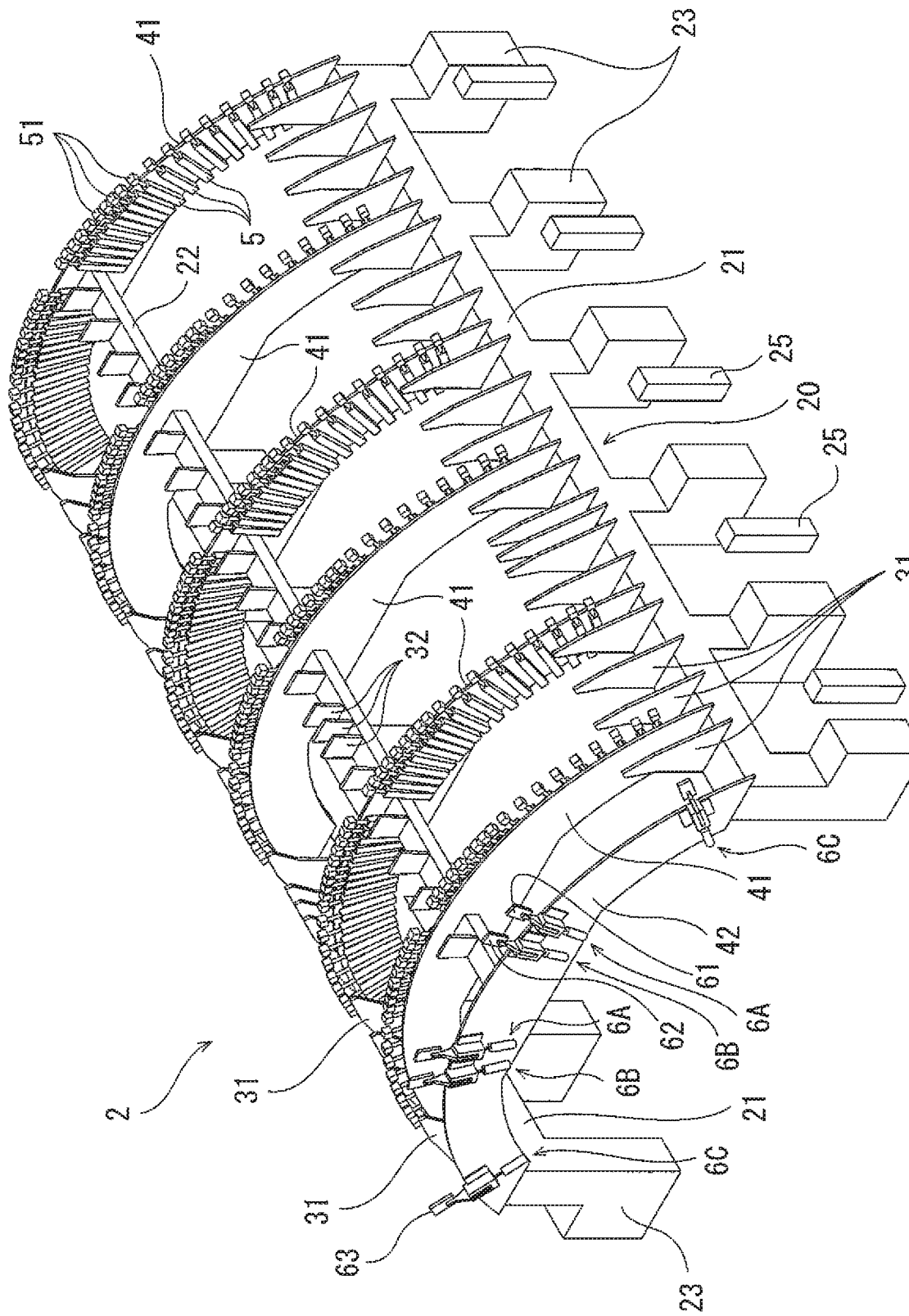
FIG. 1 is a perspective view of an aircraft fuselage assembling jig according to one embodiment of the present invention.
Figure 2A:
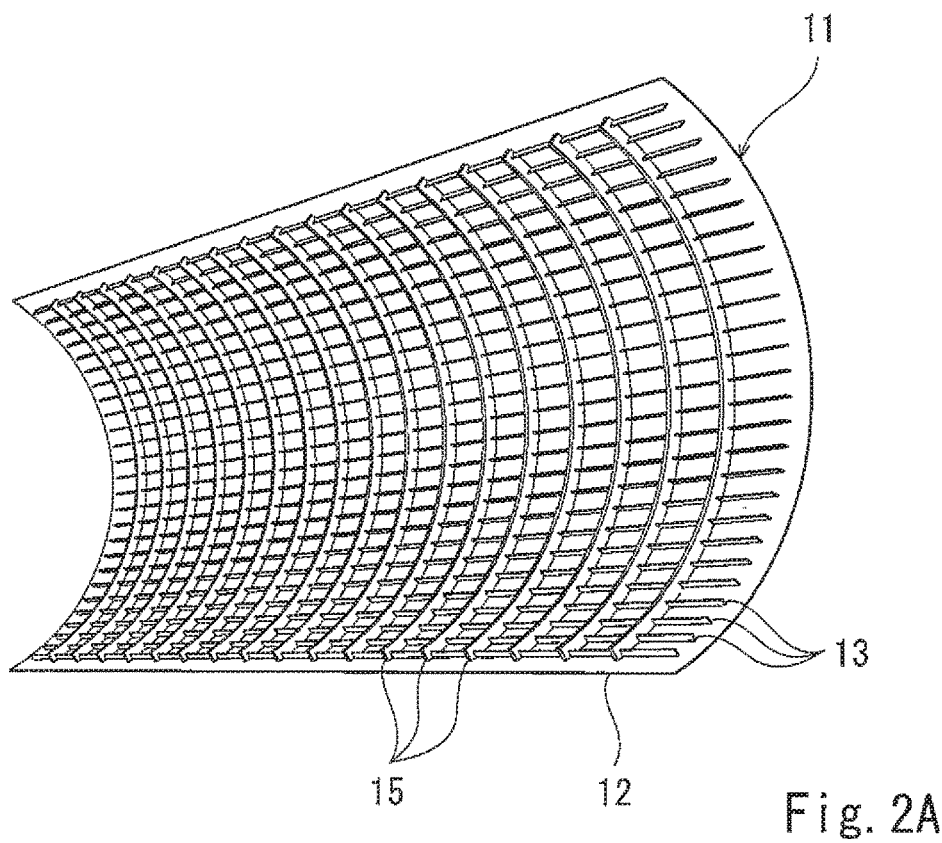
FIG. 2A is an inside perspective view of a panel assembly in which a plurality of aircraft fuselage frames are joined to an aircraft fuselage panel.

FIG. 1 shows an aircraft fuselage assembling jig 2 according to one embodiment of the present invention. The aircraft fuselage assembling jig 2 is used when joining a plurality of aircraft fuselage frames 15 to an aircraft fuselage panel 11 as shown in FIG. 2A.

Figure 2B:
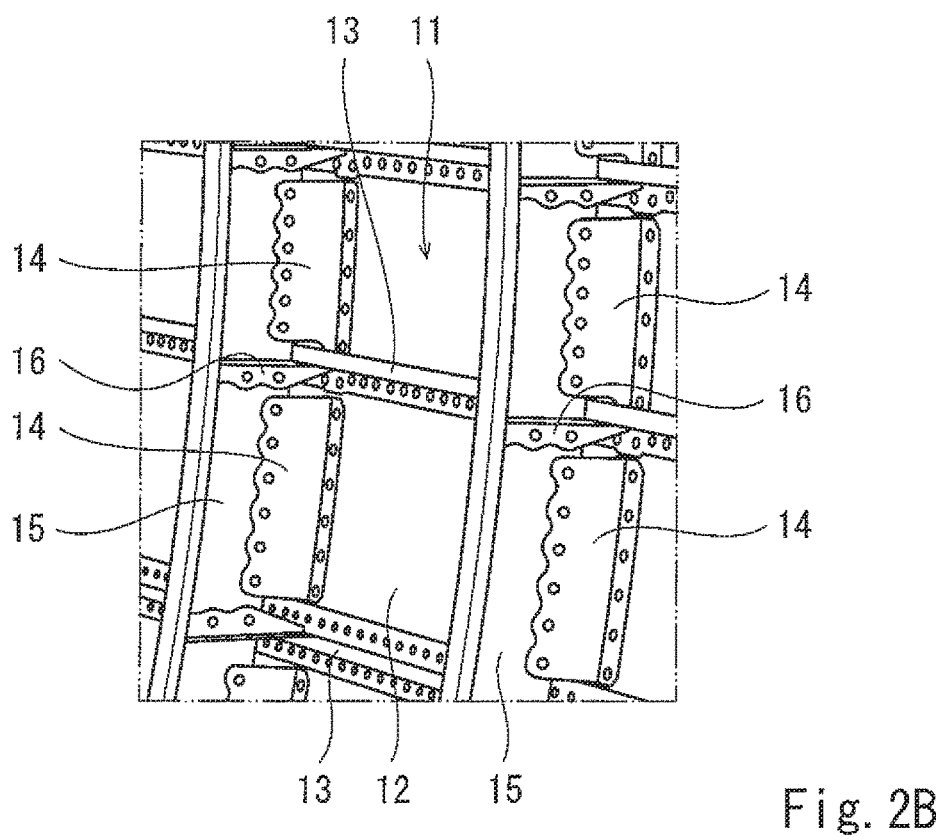
FIG. 2B is an enlarged view of a part of FIG. 2A.

The longitudinal direction of the aircraft fuselage is defined herein as the axial direction of the aircraft fuselage panel 11; the direction extending radially from the central axis of the aircraft fuselage is defined herein as the radial direction of the aircraft fuselage panel 11; and the direction rotating about the central axis of the aircraft fuselage is defined herein as the circumferential direction of the aircraft fuselage panel 11. As shown in FIGS. 2A and 2B, the aircraft fuselage panel 11 includes: a skin 12; and a plurality of stringers 13 and a plurality of shear ties 14 both fixed to the inner surface of the skin 12 by rivets. The stringers 13 extend in the axial direction of the aircraft fuselage panel 11. The shear ties 14 are disposed between the stringers 13 adjacent to each other, such that a plurality of shear tie lines are formed orthogonally to the stringers 13. Between the shear ties 14, clips 16 are fixed to the stringers 13 by rivets. Each of the aircraft fuselage frames 15 is fastened to the shear ties 14 and the clips 16 of a corresponding one of the shear tie lines by rivets.

Returning to FIG. 1, the aircraft fuselage assembling jig 2 includes a base 20, which is in such a size that the base 20 can support the aircraft fuselage panel 11. The aircraft fuselage assembling jig 2 is a horizontal type jig, on which the aircraft fuselage panel 11 is placed in a laid-down state. Accordingly, the base 20 overlaps the aircraft fuselage panel 11 when seen in the vertical direction. Specifically, the base 20 includes a pair of side beams 21 extending in the axial direction of the aircraft fuselage panel 11 and a plurality of support pillars 23 supporting each of the side beams 21. At both sides of the aircraft fuselage assembling jig 2, a plurality of support pedestals 25 are installed. A frame jig 9, which will be described below, is placed on the plurality of support pedestals 25.

Between the pair of side beams 21, a plurality of header plates 41 are disposed, each of which extends between the side beams 21 in a bridging manner. These header plates 41 are arranged parallel to each other in the axial direction of the aircraft fuselage panel 11. Each of the header plates 41 protrudes upward from the base 20 so as to extend along the aircraft fuselage panel 11.

Further, between the pair of side beams 21, a center beam 22 is provided such that the center beam 22 crosses all the header plates 41. Similar to the side beams 21, the center beam 22 extends in the axial direction of the aircraft fuselage panel 11.

The pair of side beams 21 is provided with a plurality of first frame indexes 31 for positioning both ends of each aircraft fuselage frame 15. The center beam 22 is provided with a plurality of second frame indexes 32 for positioning the substantial center of each aircraft fuselage frame 15.

Figure 7:
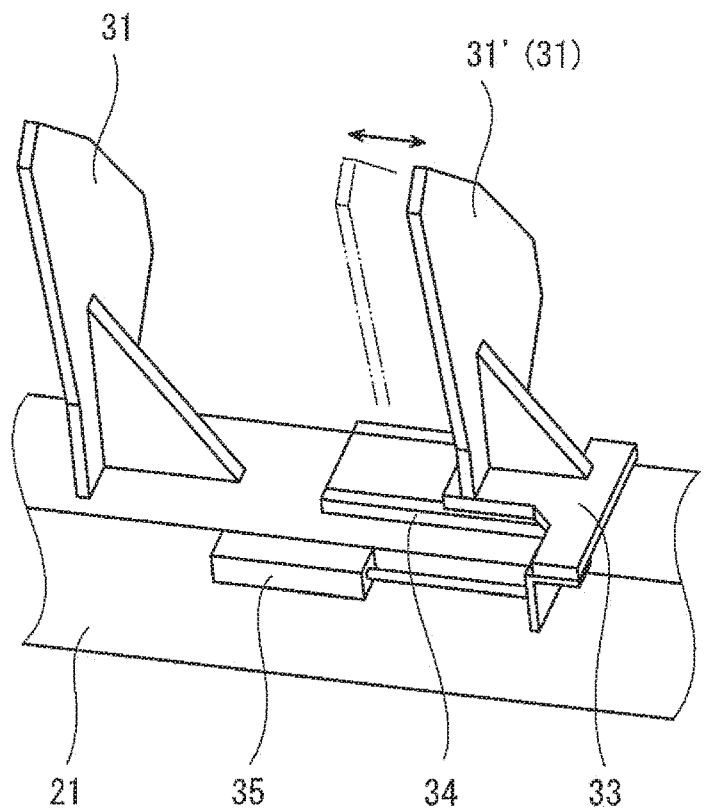
FIG. 7 is a perspective view of a movable frame index among first frame indexes.
Figure 8:
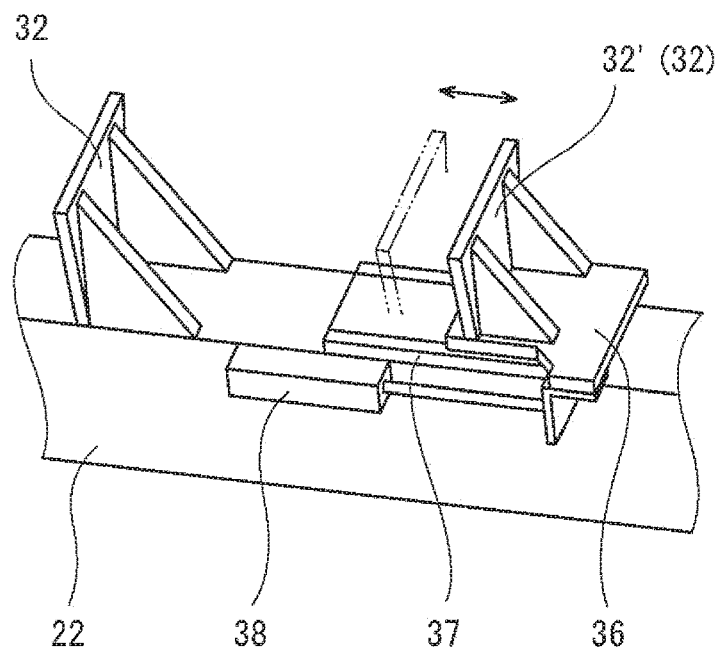
FIG. 8 is a perspective view of a movable frame index among second frame indexes.

In the present embodiment, the aircraft fuselage panel 11 has two types of shear tie arrangement patterns. Accordingly, as shown in FIG. 7, some of the first frame indexes 31 are movable frame indexes 31'. Similarly, as shown in FIG. 8, some of the second frame indexes 32 are movable frame indexes 32'. It should be noted that the movable frame indexes 32' of the second frame indexes 32 are disposed at the same positions as those of the movable frame indexes 31' of the first frame indexes 31 in the axial direction of the aircraft fuselage panel 11.

As shown in FIG. 7, the first frame indexes 31 except the movable frame indexes 31' are directly fixed to the side beams 21. On the other hand, each of the movable frame indexes 31' of the first frame indexes 31 is fixed to a base 33, which is supported by a slide mechanism 34 such that the base 33 is slidable in the axial direction of the aircraft fuselage panel 11. The side beams 21 are further provided with first frame index actuators 35, and the bases 33 are coupled to movable parts of the respective first frame index actuators 35.

Each of the first frame index actuators 35 is a pneumatic cylinder, for example. Alternatively, each first frame index actuator 35 may be a hydraulic cylinder or an electric cylinder. The first frame index actuator 35 moves the movable frame index 31' via the base 33 in the axial direction of the aircraft fuselage panel 11 between a first position and a second position. The first position (the position indicated by solid line in FIG. 7) corresponds to one type of shear tie arrangement pattern. The second position (the position indicated by two-dot chain line in FIG. 7) corresponds to the other type of shear tie arrangement pattern. The first position and the second position are both stroke ends of the first frame index actuator 35.

It should be noted that if the movable frame indexes 31' are only those arranged continuously, then the movable frame indexes 31' may be fixed to a shared base 33, and the base 33 may be driven by one first frame index actuator 35. That is, it will suffice if each of the side beams 21 is provided with at least one first frame index actuator 35.

Similarly, as shown in FIG. 8, the second frame indexes 32 except the movable frame indexes 32' are directly fixed to the center beam 22. On the other hand, each of the movable frame indexes 32' of the second frame indexes 32 is fixed to a base 36, which is supported by a slide mechanism 37 such that the base 36 is slidable in the axial direction of the aircraft fuselage panel 11. The center beam 22 is further provided with second frame index actuators 38, and the bases 36 are coupled to movable parts of the respective second frame index actuators 38.

Each of the second frame index actuators 38 is a pneumatic cylinder, for example. Alternatively, each second frame index actuator 38 may be a hydraulic cylinder or an electric cylinder. The second frame index actuator 38 moves the movable frame index 32' via the base 36 in the axial direction of the aircraft fuselage panel 11 between a first position and a second position. The first position (the position indicated by solid line in FIG. 8) corresponds to the one type of shear tie arrangement pattern. The second position (the position indicated by two-dot chain line in FIG. 8) corresponds to the other type of shear tie arrangement pattern. The first position and the second position are both stroke ends of the second frame index actuator 38.

It should be noted that if the movable frame indexes 32' are only those arranged continuously, then the movable frame indexes 32' may be fixed to a shared base 36, and the base 36 may be driven by one second frame index actuator 38. That is, it will suffice if the center beam 22 is provided with at least one second frame index actuator 38.

Figure 4:
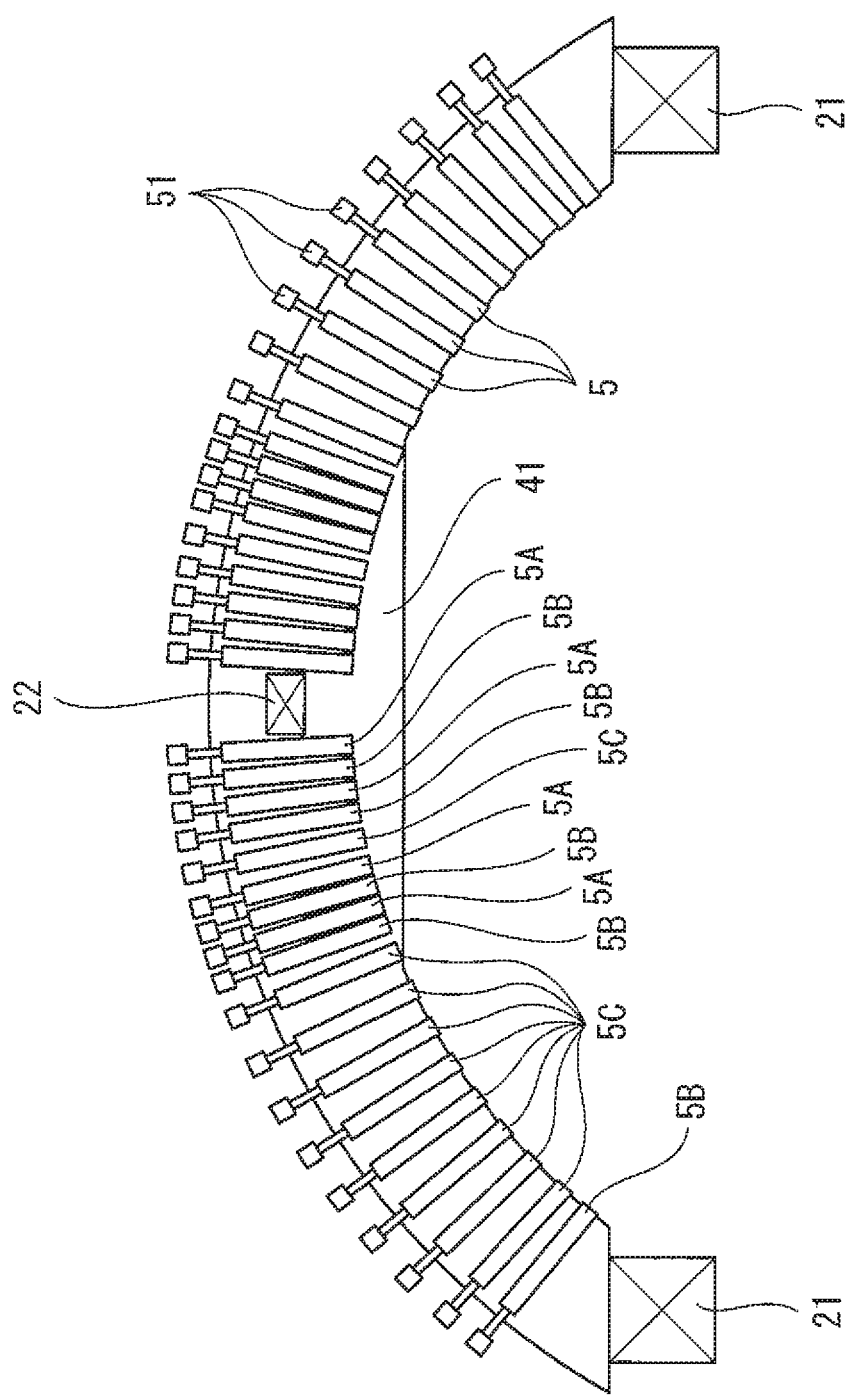
FIG. 4 is a front view of a header plate.

As shown in FIG. 4, a plurality of electric cylinders 5 are radially provided on each of the header plates 41. The axial direction of each electric cylinder 5 coincides with the radial direction of the aircraft fuselage panel 11.

In the present embodiment, the aircraft fuselage panel 11 has two types of skin patterns. Accordingly, the electric cylinders 5 include: first electric cylinders 5A used only in one type of skin pattern; second electric cylinders 5B used only in the other type of skin pattern; and third electric cylinders 5C used in both the two types of skin patterns. The first to third electric cylinders 5A to 5C are arranged symmetrically. FIG. 4 shows one example of the arrangement/layout of the first to third electric cylinders 5A to 5C.

The arrangement/layout of the first to third electric cylinders 5A to 5C is of course not limited to this example. The aircraft fuselage panel 11 may have three or more types of skin patterns.

Figure 5:
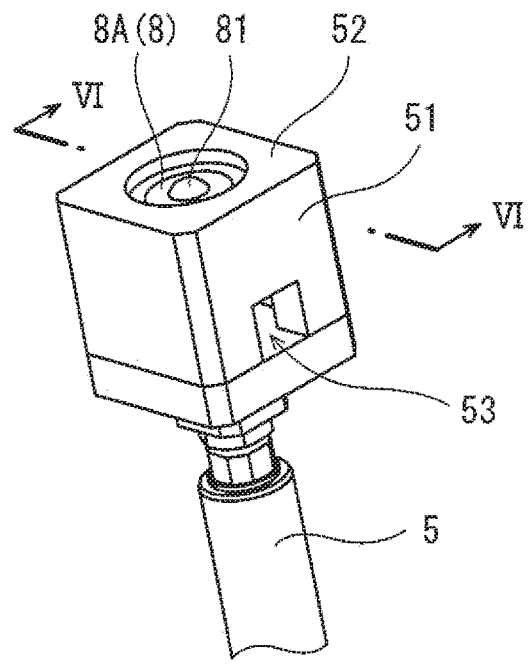
FIG. 5 is a perspective view a receiving member.

Each electric cylinder 5 moves a receiving member 51, which contacts the skin 12 of the aircraft fuselage panel 11, in the radial direction of the aircraft fuselage panel 11. As shown in FIG. 5, the receiving member 51 is block-shaped, and has a receiving surface 52 facing the opposite direction of the electric cylinder 5.

The receiving member 51 is provided with an air lifting device 8. The air lifting device 8, when supplied with air pressure, lifts the skin 12 of the aircraft fuselage panel 11 from the receiving surface 52 of the receiving member 51, and supports the aircraft fuselage panel 11 such that the aircraft fuselage panel 11 is slidable. In the present embodiment, the air lifting device 8 is an air lifting bearing 8A. However, as an alternative, the air lifting device 8 may be, for example, a non-contact type device that, when supplied with air pressure, blows air out of the receiving surface 52 to form an air gap between the skin 12 and the receiving surface 52.

Figures 6A, 6B:
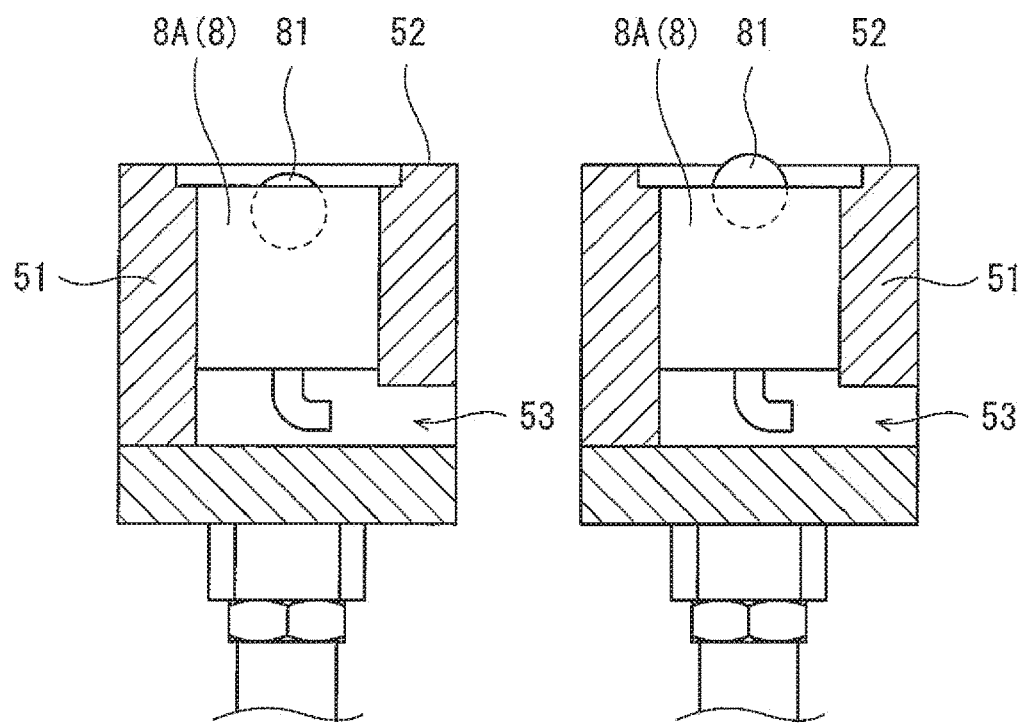
FIGS. 6A and 6B are sectional views each taken along line VI-VI of FIG. 5.

As shown in FIG. 6A, the air lifting bearing 8A is embedded in the central part of the receiving surface 52. An opening 53 is formed in a side surface of the receiving member 51. Through the opening 53, an air pipe is connected to an air connecting port of the air lifting bearing 8A. Alternatively, for example, the air lifting bearing 8A may be mounted to a side surface of the receiving member 51 via a bracket.

The air lifting bearing 8A includes a rollable sphere 81. When no air pressure is supplied to the air lifting bearing 8A, the sphere 81 is retracted to be inside the receiving surface 52 as shown in FIG. 6A. When air pressure is supplied to the air lifting bearing 8A, the sphere 81 protrudes from the receiving surface 52 as shown in FIG. 6B.

Figure 9:
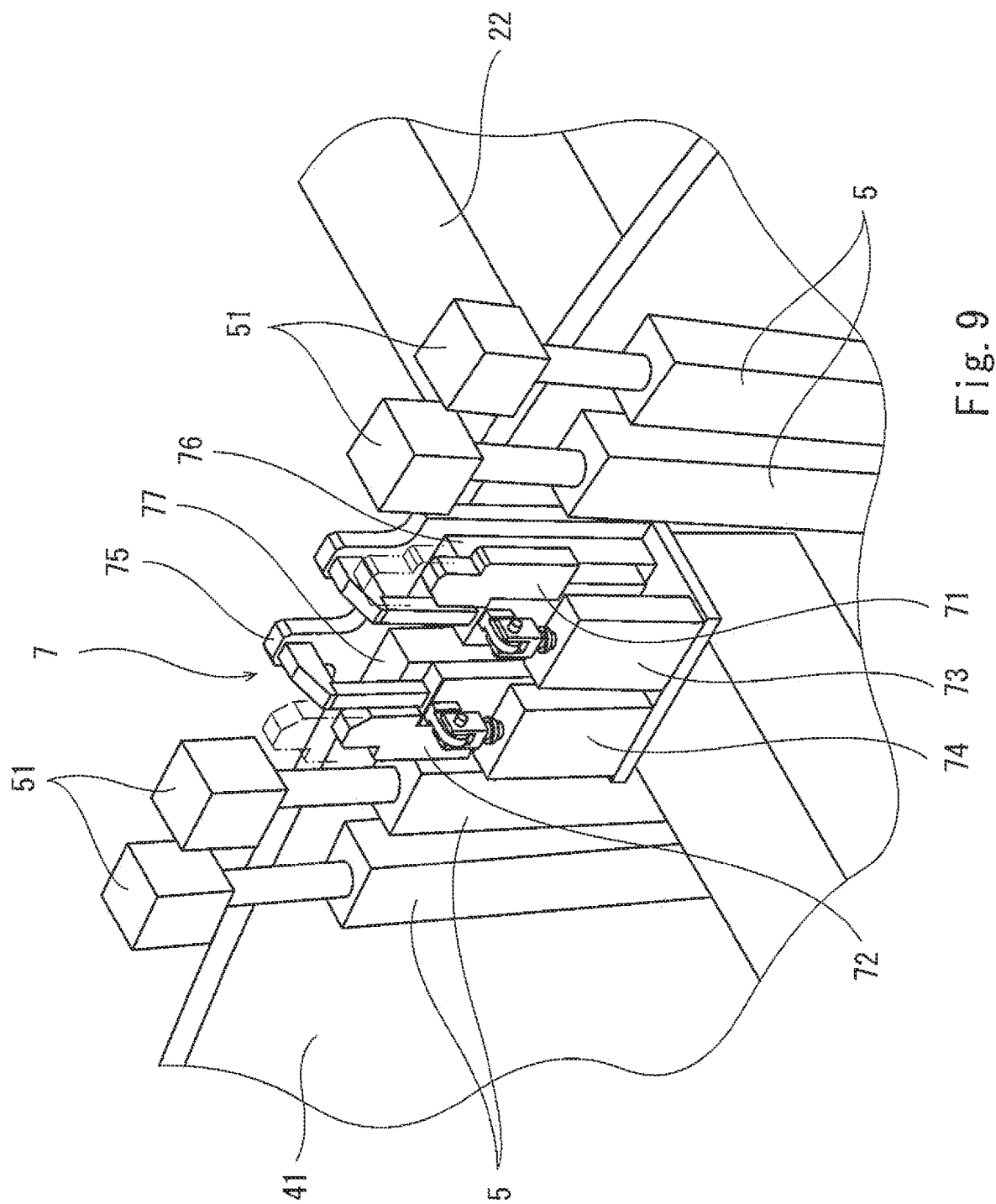
FIG. 9 is a perspective view around first and second stringer indexes.

In the present embodiment, the aircraft fuselage panel 11 has two types of stringer arrangement patterns. Accordingly, each of the header plates 41 is provided with a stringer positioning device 7 shown in FIG. 9 (FIG. 1, FIG. 3, and FIG. 4 do not show the stringer positioning devices 7 for the purpose of simplifying the drawings). However, it is not essential that all the header plates 41 be provided with the stringer positioning devices 7. It will suffice if at least one header plate 41 is provided with the stringer positioning device 7.

The stringer positioning device 7 includes: a first stringer index 71 for engaging with one stringer 13 in one type of stringer arrangement pattern; and a second stringer index 72 for engaging with one stringer 13 in the other type of stringer arrangement pattern. The first stringer index 71 is supported by a first slide mechanism 76, such that the first stringer index 71 is slidable in the radial direction of the aircraft fuselage panel 11. The second stringer index 72 is supported by a second slide mechanism 77, such that the second stringer index 72 is slidable in the radial direction of the aircraft fuselage panel 11. The first slide mechanism 76 and the second slide mechanism 77 are mounted to a bracket 75 fixed to the header plate 41.

The first stringer index 71 is coupled to a movable part of a first stringer index actuator 73, and the second stringer index 72 is coupled to a movable part of a second stringer index actuator 74. The first stringer index actuator 73 and the second stringer index actuator 74 are mounted to the aforementioned bracket 75.

The first stringer index actuator 73 and the second stringer index actuator 74 are pneumatic cylinders, for example.

Alternatively, the first stringer index actuator 73 and the second stringer index actuator 74 may be hydraulic cylinders or electric cylinders. The first stringer index actuator 73 moves the first stringer index 71 between a radially outward engagement position (the position indicated by two-dot chain line in FIG. 9) and a radially inward non-engagement position (the position indicated by solid line in FIG. 9). The engagement position and the non-engagement position are both stroke ends of the first stringer index actuator 73. When the first stringer index 71 moves to the engagement position, the first stringer index 71 engages with one stringer 13 in the one type of stringer arrangement pattern. The second stringer index actuator 74 moves the second stringer index 72 between a radially outward engagement position (the position indicated by two-dot chain line in FIG. 9) and a radially inward non-engagement position (the position indicated by solid line in FIG. 9). The engagement position and the non-engagement position are both stroke ends of the second stringer index actuator 74. When the second stringer index 72 moves to the engagement position, the second stringer index 72 engages with one stringer 13 in the other type of stringer arrangement pattern.

Returning to FIG. 1, between the pair of side beams 21, an end plate 42 is disposed, which extends between end portions of the side beams 21 in a bridging manner. The end plate 42 is parallel to the header plates 41, and outside the aircraft fuselage panel 11, the end plate 42 protrudes upward from the base 20 so as to extend along the aircraft fuselage panel 11. An end portion of the aforementioned center beam 22 is joined to the end plate 42.

In the present embodiment, the aircraft fuselage panel 11 has two types of skin edge patterns. Accordingly, the end plate 42 is provided with: two first skin edge positioning devices 6A used only in one type of skin edge pattern; two second skin edge positioning devices 6B used only in the other type of skin edge pattern; and two third skin edge positioning devices 6C used in both the two types of skin edge patterns. The third skin edge positioning devices 6C are disposed on both end portions of the end plate 42. The first skin edge positioning devices 6A and the second skin edge positioning devices 6B are disposed at such positions that the space between the third skin edge positioning devices 6C is trisected substantially equally.

Figure 10:
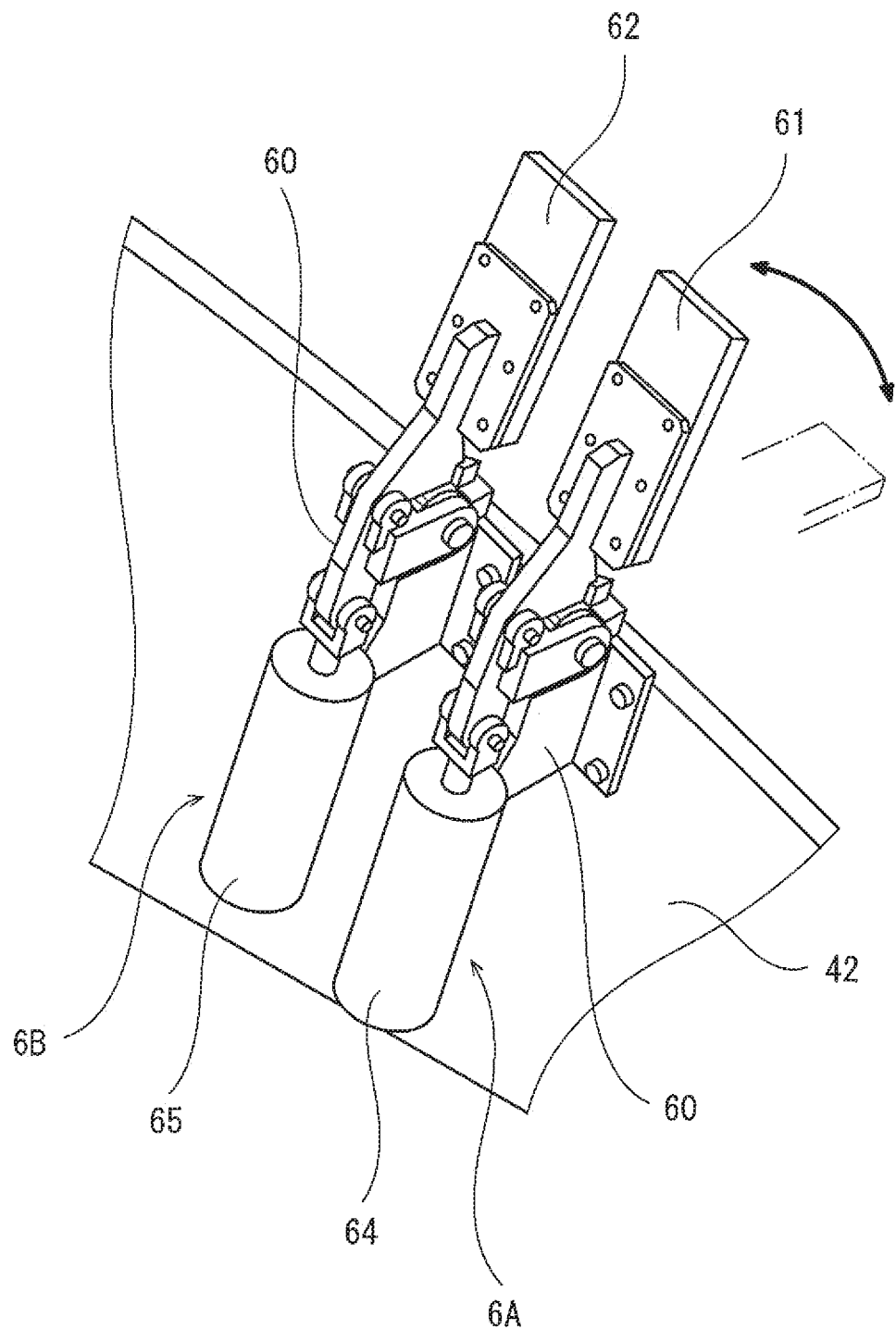
FIG. 10 is a perspective view around first and second edge indexes.

As shown in FIG. 10, each of the first skin edge positioning devices 6A includes: a first edge index 61 for contacting the edge of the skin 12 in the one type of skin edge pattern; and a first edge index actuator 64 for operating the first edge index 61. The first edge index actuator 64 is coupled to the first edge index 61 via a toggle mechanism 60 fixed to the end plate 42.

The first edge index actuator 64 is a pneumatic cylinder, for example. Alternatively, the first edge index actuator 64 may be a hydraulic cylinder or an electric cylinder. The first edge index actuator 64 moves the first edge index 61 between a contact position and a non-contact position. When the first edge index 61 is at the contact position (the position indicated by two-dot chain line in FIG. 10), the first edge index 61 contacts the edge of the skin 12 in such a manner that the first edge index 61 and the skin 12 are butted with each other. When the first edge index 61 is at the non-contact position (the position indicated by solid line in FIG. 10), the first edge index 61 is substantially parallel to the end plate 42. The contact position and the non-contact position are both stroke ends of the first edge index actuator 64.

Similarly, each of the second skin edge positioning devices 6B includes: a second edge index 62 for contacting the edge of the skin 12 in the other type of skin edge pattern; and a second edge index actuator 65 for operating the second edge index 62. The second edge index actuator 65 is coupled to the second edge index 62 via a toggle mechanism 60 fixed to the end plate 42.

The second edge index actuator 65 is a pneumatic cylinder, for example. Alternatively, the second edge index actuator 65 may be a hydraulic cylinder or an electric cylinder. The second edge index actuator 65 moves the second edge index 62 between a contact position and a non-contact position. When the second edge index 62 is at the contact position, the second edge index 62 contacts the edge of the skin 12 in such a manner that the second edge index 62 and the skin 12 are butted with each other. When the second edge index 62 is at the non-contact position (the position indicated by solid line in FIG. 10), the second edge index 62 is substantially parallel to the end plate 42. The contact position and the non-contact position are both stroke ends of the second edge index actuator 65.

Figure 3:
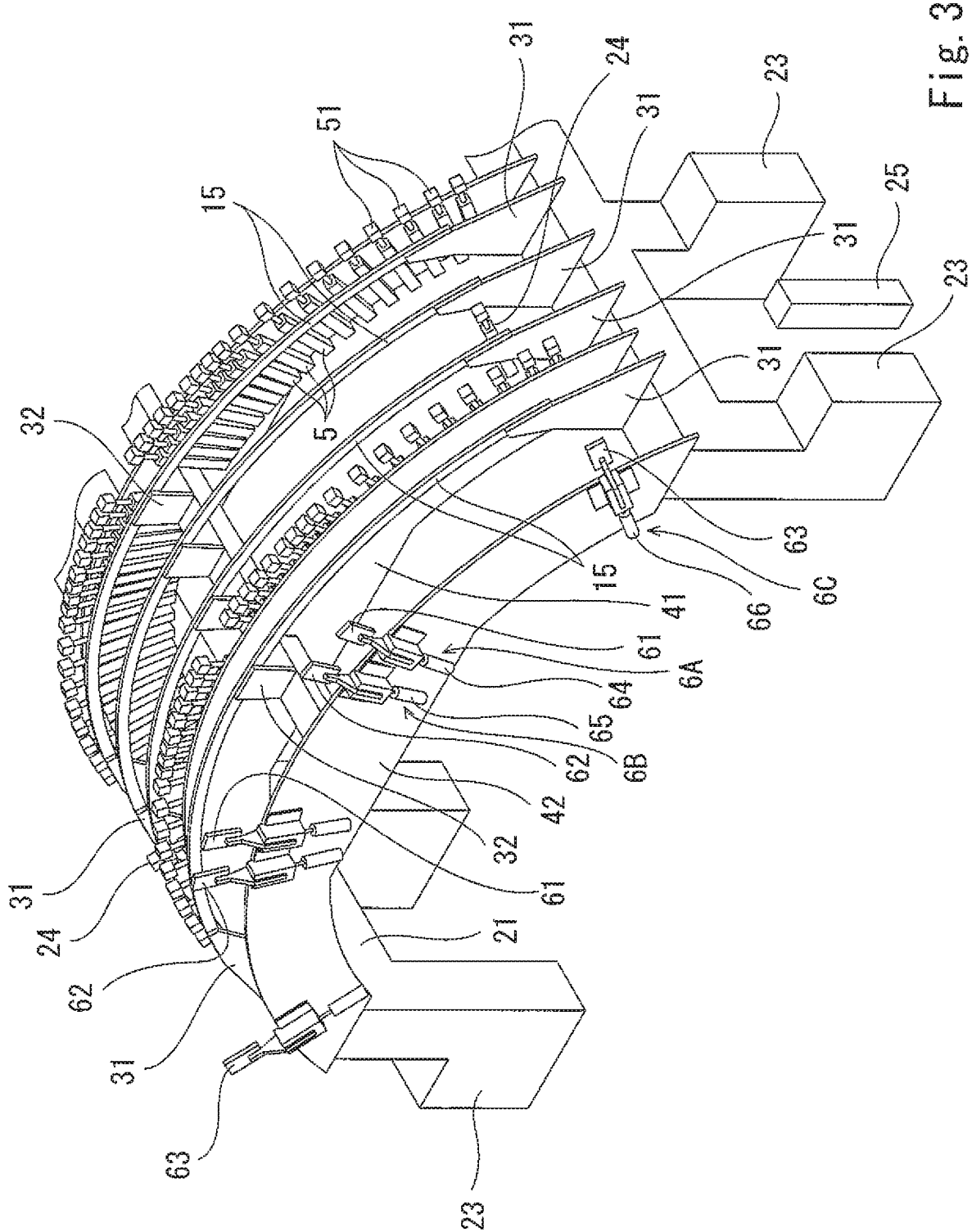
FIG. 3 is an enlarged view of an end portion of the aircraft fuselage assembling jig, on which the plurality of aircraft fuselage frames are set.

Meanwhile, as shown in FIG. 3, each of the third skin edge positioning devices 6C includes: a third edge index 63 for contacting the edge of the skin 12 in both the two types of skin edge patterns; and a third edge index actuator 66 for operating the third edge index 63. The third edge index actuator 66 is coupled to the third edge index 63 via a toggle mechanism 60 fixed to the end plate 42.

The third edge index actuator 66 is a pneumatic cylinder, for example. Alternatively, the third edge index actuator 66 may be a hydraulic cylinder or an electric cylinder. The third edge index actuator 66 moves the third edge index 63 between a contact position and a non-contact position. When the third edge index 63 is at the contact position, the third edge index 63 contacts the edge of the skin 12 in such a manner that the third edge index 63 and the skin 12 are butted with each other. When the third edge index 63 is at the non-contact position, the third edge index 63 is substantially parallel to the end plate 42. The contact position and the non-contact position are both stroke ends of the third edge index actuator 66.

According to the aircraft fuselage assembling jig 2 of the present embodiment described above, in a case where the aircraft fuselage assembling jig 2 is used for a plurality of aircraft fuselage panels 11 whose skins 12 have different curvatures from each other, the receiving members 51 can be disposed, for each aircraft fuselage panel 11, at positions that match the curvature of the skin 12 by adjusting the strokes of the electric cylinders 5. In addition, the strokes of the electric cylinders 5 can be adjusted very highly precisely. Therefore, the aircraft fuselage assembling jig 2 can be used for the plurality of aircraft fuselage panels 11.

The aircraft fuselage panel 11 is placed on the horizontal-type aircraft fuselage assembling jig 2 by a crane. However, in the case of performing the positioning of the aircraft fuselage panel 11 while transferring the aircraft fuselage panel 11 by the crane, it is difficult to perform position adjustments with a higher precision than a precision of millimeters. In this respect, in the present embodiment, the receiving members 51 are provided with the air lifting bearings 8A. Accordingly, in a state where the receiving members 51 are in contact with the skin 12 of the aircraft fuselage panel 11, by supplying air pressure to the air lifting bearings 8A, the aircraft fuselage panel 11 is rendered slidable. Therefore, while supporting the aircraft fuselage panel 11 by the air lifting bearings 8A, the positioning of the aircraft fuselage panel 11 can be performed with high precision.

Further, in the present embodiment, the movable frame indexes 31' and 32' are moved by the first and second frame index actuators 35 and 38 between the first and second positions. Accordingly, when using the movable frame indexes 31' and 32', the position of each of the movable frame indexes 31' and 32' can be readily switched between the first position and the second position in accordance with the shear tie arrangement pattern.

Still further, in the present embodiment, the first and second stringer indexes 71 and 72 are moved by the first and second stringer index actuators 73 and 74 between the engagement and non-engagement positions. Accordingly, the stringer indexes to use can be readily switched between the first stringer indexes 71 and the second stringer indexes 72 in accordance with the stringer arrangement pattern.

Still further, in the present embodiment, the first and second edge indexes 61 and 62 are moved by the first and second edge index actuators 64 and 65 between the contact and non-contact positions. Accordingly, the edge indexes to use can be readily switched between the first edge indexes 61 and the second edge indexes 62 in accordance with the skin edge pattern.

Hereinafter, a method of handling the aircraft fuselage panel 11 relative to the aircraft fuselage assembling jig 2 is described.

Figure 11:
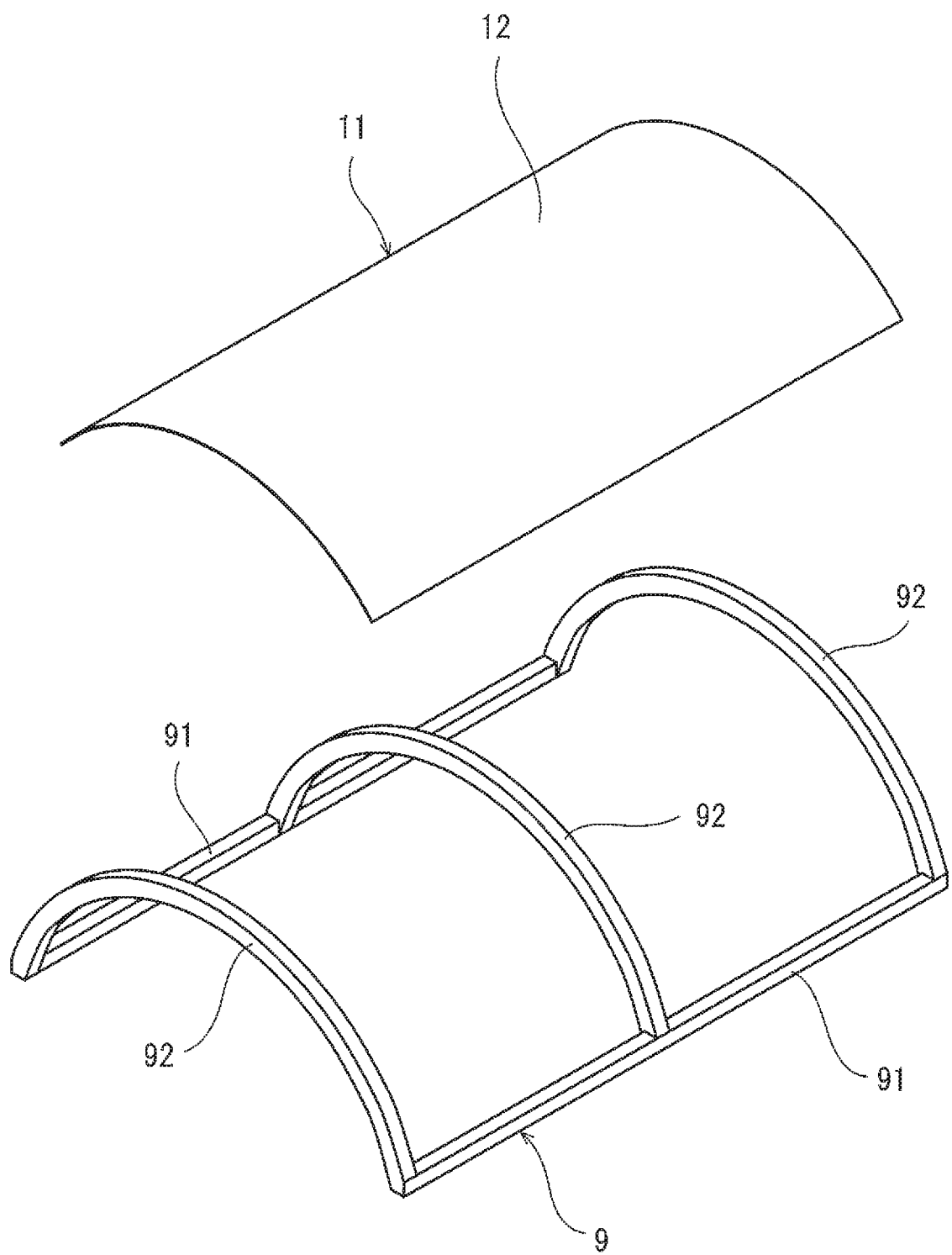
FIG. 11 is a perspective view of a frame jig and the aircraft fuselage panel.

First, the aircraft fuselage panel 11 is transferred by using the frame jig 9 shown in FIG. 11. The frame jig 9 is intended for holding the aircraft fuselage panel 11. In the present embodiment, the frame jig 9 includes: a pair of longitudinal frames 91 each extending in the axial direction of the aircraft fuselage panel 11; and a plurality of (in the illustrated example, three) transverse frames 92 each extending between the longitudinal frames 91 in a bridging manner in the circumferential direction of the aircraft fuselage panel 11. However, the frame jig 9 may have any structure, so long as the frame jig 9 is capable of holding the aircraft fuselage panel 11.

As a preparation before transferring the aircraft fuselage panel 11, all the aircraft fuselage frames 15 are temporarily set on the aircraft fuselage assembling jig 2. For example, each of the aircraft fuselage frames 15 is placed on the side beams 21 and the center beam 22 near corresponding first and second frame indexes 31 and 32. Also, the electric cylinders 5 are contracted to move all the receiving members backward to respective positions where the receiving members do not come into contact with the aircraft fuselage panel 11 when the frame jig 9 is placed on the support pedestals 25 as described below. In addition, the first and second stringer indexes 71 and 72 are moved to their non-engagement positions, and the first and second edge indexes 61 and 62 are moved to their non-contact positions.

Figure 12:
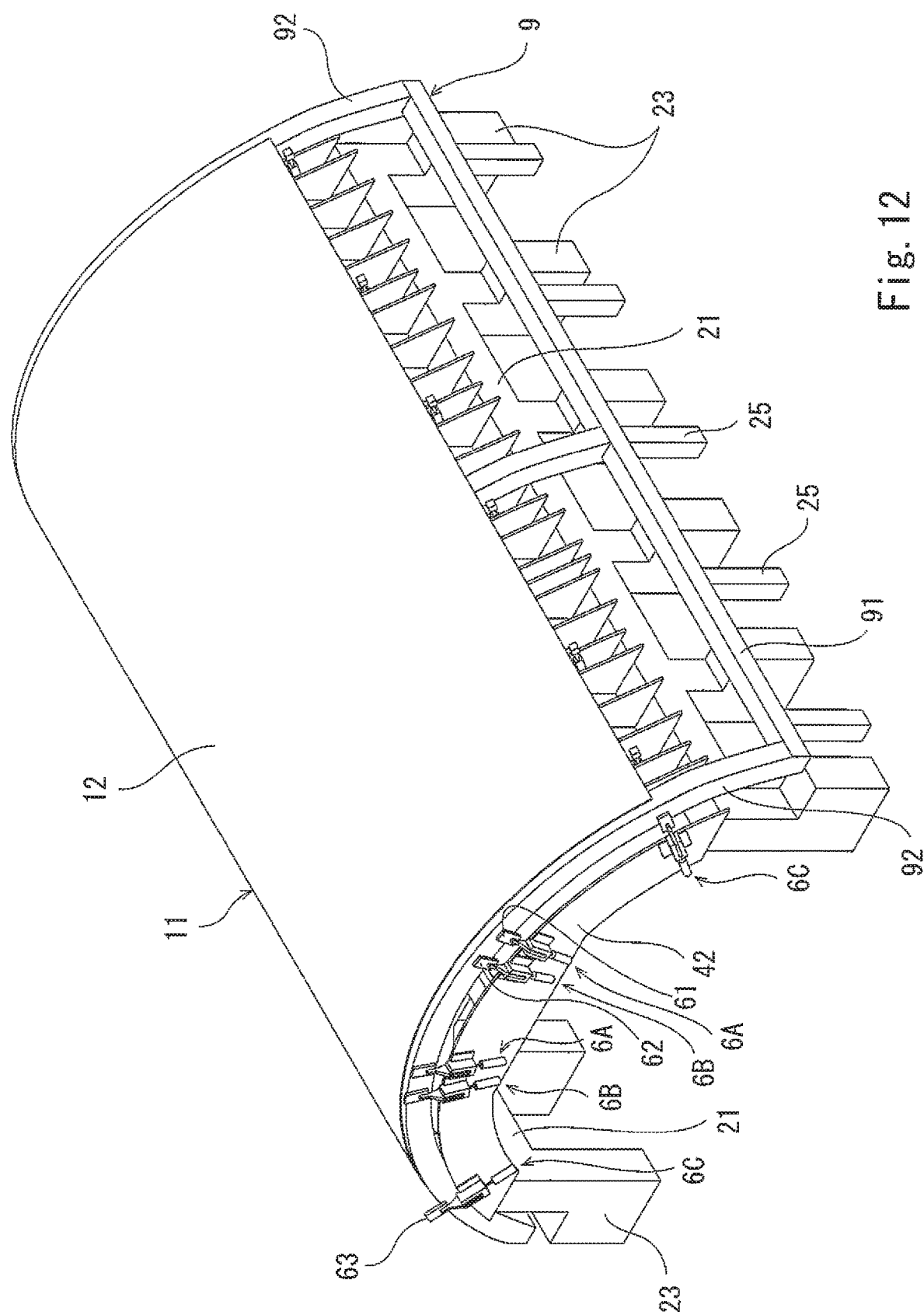
FIG. 12 shows a state where the frame jig holding the aircraft fuselage panel is placed on support pedestals.

When the preparation is completed, the frame jig 9 holding the aircraft fuselage panel 11 is placed on the support pedestals 25 by the crane (not shown) as shown in FIG. 12. Then, the electric cylinders 5 are expanded, and while lifting the aircraft fuselage panel 11 from the frame jig 9 by the electric cylinders 5, the receiving members 51 are positioned at respective design positions for positioning the skin 12 of the aircraft fuselage panel 11. Thereafter, as shown in FIG. 3, each aircraft fuselage frame 15 is fixed to the corresponding first and second frame indexes 31 and 32, and thereby the aircraft fuselage frame 15 is positioned at its normal position.

Next, air pressure is supplied to all the air lifting bearings 8A to render the aircraft fuselage panel 11 slidable. Concurrently, either the first stringer indexes 71 or the second stringer indexes 72 are moved to their engagement positions, and also, the third edge indexes 63 and either the first edge indexes 61 or the second edge indexes 62 are moved to their contact positions.

Thereafter, while sliding the aircraft fuselage panel 11, the aircraft fuselage panel 11 is positioned at its normal position that is defined by the stringer indexes (71 or 72) and the edge indexes (63 and either 61 or 62). After the positioning of the aircraft fuselage panel 11 is thus performed, the supply of the air pressure to the air lifting bearings 8A is stopped, and thereby the overall skin 12 of the aircraft fuselage panel 11 is brought into contact with the receiving surfaces 52 of all the receiving members 51.

Thereafter, the shear ties 14 and the clips 16, which are included in the aircraft fuselage panel 11, and the aircraft fuselage frames 15 are subjected to hole machining together, and then fastened together by rivets.

According to the above-described handling method, the following advantages are obtained. In a state where the receiving members 51 have been moved to their respective design positions by operating the electric cylinders 5, when the aircraft fuselage panel 11 is placed on the aircraft fuselage assembling jig 2, there is a risk that the load may concentrate on particular electric cylinders 5. In this respect, according to the above-described handling method, the electric cylinders 5 lift the aircraft fuselage panel 11 in a stationary state, and thereby the load on the electric cylinders 5 can be made uniform.

After joining the aircraft fuselage frames 15 to the aircraft fuselage panel 11, the aircraft fuselage panel 11 is handled in the reverse order to the above-described order. First, air pressure is supplied to all the air lifting bearings 8A to render the aircraft fuselage panel 11 slidable. Then, the aircraft fuselage panel 11 is slidingly moved to a position at which the aircraft fuselage panel 11 is holdable by the frame jig 9. Thereafter, the aircraft fuselage panel 11 is lowered by the electric cylinders 5 and held by the frame jig 9. Finally, the frame jig 9, which is holding the aircraft fuselage panel 11, is transferred from above the aircraft fuselage assembling jig 2 to a different location by the crane. This method makes it possible to transfer a panel assembly in which the aircraft fuselage frames 15 are joined to the aircraft fuselage panel 11 to the different location by the crane while holding the panel assembly by the frame jig 9.

VARIATIONS

The present invention is not limited to the above-described embodiment. Various modifications can be made without departing from the spirit of the present invention.

For example, the center beam 22 and the second frame indexes 32 can be eliminated depending on the positions of the first frame indexes 31.

The frame index actuators 35 and 38 may be eliminated; and each of the movable frame indexes 31' and 32' may be manually moved between the first position and the second position, and may be fixed at the first position or the second position by a bolt or the like. Similarly, the first and second stringer index actuators 73 and 74 may be eliminated; and each of the first and second stringer indexes 71 and 72 may be manually moved between the engagement position and the non-engagement position, and may be fixed at the engagement position or the non-engagement position by a bolt or the like. Similarly, the first and second edge index actuators 64 and 65 may be eliminated; and each of the first and second edge indexes 61 and 62 may be manually moved between the contact position and the non-contact position, and may be fixed at the contact position or the non-contact position by a bolt or the like.

The aircraft fuselage panel 11 may have three or more types of shear tie arrangement patterns. For example, in a case where the first and second frame index actuators 35 and 38 are electric cylinders, the movable frame indexes 31' and 32' can be moved to intended positions with high precision. In addition, the aircraft fuselage panel 11 may have three or more types of stringer arrangement patterns, and may have three or more types of skin edge patterns.

Alternatively, the aircraft fuselage panel 11 may have only one type of shear tie arrangement pattern, may have only one type of stringer arrangement pattern, and may have only one type of skin edge pattern. That is, all the first and second frame indexes 31 and 32 may be fixed-type frame indexes; fixed-type stringer indexes may be adopted instead of the first and second stringer indexes 71 and 72; and fixed-type edge indexes may be adopted instead of the first and second edge indexes 61 and 62.

REFERENCE SIGNS LIST 11 aircraft fuselage panel
12 skin
15 aircraft fuselage frame
2 aircraft fuselage assembling jig
20 base
21 side beam
25 support pedestal
31, 32 frame index
41 header plate
5 electric cylinder
51 receiving member
52 receiving surface
8 air lifting device
8A air lifting bearing
81 sphere
9 frame jig

The invention claimed is:

1. A method of handling an aircraft fuselage panel relative to an aircraft fuselage assembling jig,
the aircraft fuselage assembling jig including:
a base provided with a plurality of frame indexes for positioning both ends of a plurality of aircraft fuselage frames;
a plurality of header plates, each of which protrudes from the base so as to extend along the aircraft fuselage panel, the header plates being arranged parallel to each other in an axial direction of the aircraft fuselage panel;
a plurality of electric cylinders radially provided on each of the plurality of header plates, the electric cylinders being configured to move respective receiving members in a radial direction of the aircraft fuselage panel, the receiving members being configured to contact a skin included in the aircraft fuselage panel; and
air lifting devices that are provided on the respective receiving members and that, when supplied with air pressure, lift the skin from receiving surfaces of the respective receiving members and support the aircraft fuselage panel such that the aircraft fuselage panel is slidable,
the method comprising:
placing a frame jig holding the aircraft fuselage panel on support pedestals, the support pedestals being installed at both sides of the aircraft fuselage assembling jig;
lifting the aircraft fuselage panel from the frame jig by the plurality of electric cylinders;
supplying air pressure to the air lifting devices to render the aircraft fuselage panel slidable;
positioning the aircraft fuselage panel while sliding the aircraft fuselage panel; and
stopping supplying the air pressure to the air lifting devices after the positioning of the aircraft fuselage panel.

2. The method of handling an aircraft fuselage panel according to claim 1, comprising:
supplying air pressure to the air lifting devices to render the aircraft fuselage panel slidable after joining a plurality of aircraft fuselage frames to the aircraft fuselage panel;
slidingly moving the aircraft fuselage panel to a position at which the aircraft fuselage panel is holdable by the frame jig;
lowering the aircraft fuselage panel by the plurality of electric cylinders and holding the aircraft fuselage panel by the frame jig; and
transferring the frame jig, which is holding the aircraft fuselage panel, from above the aircraft fuselage assembling jig to a different location.

3. The method of handling an aircraft fuselage panel according to claim 2, wherein
each of the air lifting devices is an air lifting bearing including a rollable sphere that, when air pressure is supplied to the air lifting bearing, protrudes from the receiving surface of the receiving member.

4. The method of handling an aircraft fuselage panel according to claim 1, wherein
each of the air lifting devices is an air lifting bearing including a rollable sphere that, when air pressure is supplied to the air lifting bearing, protrudes from the receiving surface of the receiving member.

* * * * *